United States Patent [19]
Pabst et al.

[11] 3,896,872
[45] July 29, 1975

[54] TEMPERATURE-CONTROL SYSTEM FOR AUTOMOTIVE VEHICLES

[75] Inventors: Hans Georg Pabst, Gaimersheim; Siegfried Mildner, Affalterbach, both of Germany

[73] Assignee: Audi NSU Auto Union Aktiengesellschaft, Ingolstadt, Germany

[22] Filed: Oct. 29, 1973

[21] Appl. No.: 410,318

[30] Foreign Application Priority Data
Oct. 27, 1972  Germany............................ 2252706

[52] U.S. Cl. ......................... 165/42; 62/90; 62/173
[51] Int. Cl............................................ B61d 27/00
[58] Field of Search .............. 165/16, 23, 42; 62/90, 62/173, 428

[56] References Cited
UNITED STATES PATENTS
3,170,509   2/1965   De Rees et al. ...................... 165/42
3,662,818   5/1972   Snyder................................. 165/42

*Primary Examiner*—Charles J. Myhre
*Assistant Examiner*—Theophil W. Streule, Jr.
*Attorney, Agent, or Firm*—Karl F. Ross; Herbert Dubno

[57] ABSTRACT

A heater mounted between the fire wall and the dashboard of an automobile has an intake port which opens into a catch basin, formed under a perforated cowling by a generally horizontal extension of this fire wall, alongside a discharge port of a heat exchanger forming part of an air-conditioning unit. Within the basin the two ports are overlain by a removable shroud having an inlet for ambient air closable by a flap. Another flap on the shroud controls the circulation of cooled air from the heat exchanger through the shroud to the heater with the aid of a fan in the latter. Upon removal of the shroud and disconnection of the air conditioner from the heater, the air supply of the latter can then be controlled by a smaller shroud having a swingable cap attached thereto.

8 Claims, 6 Drawing Figures

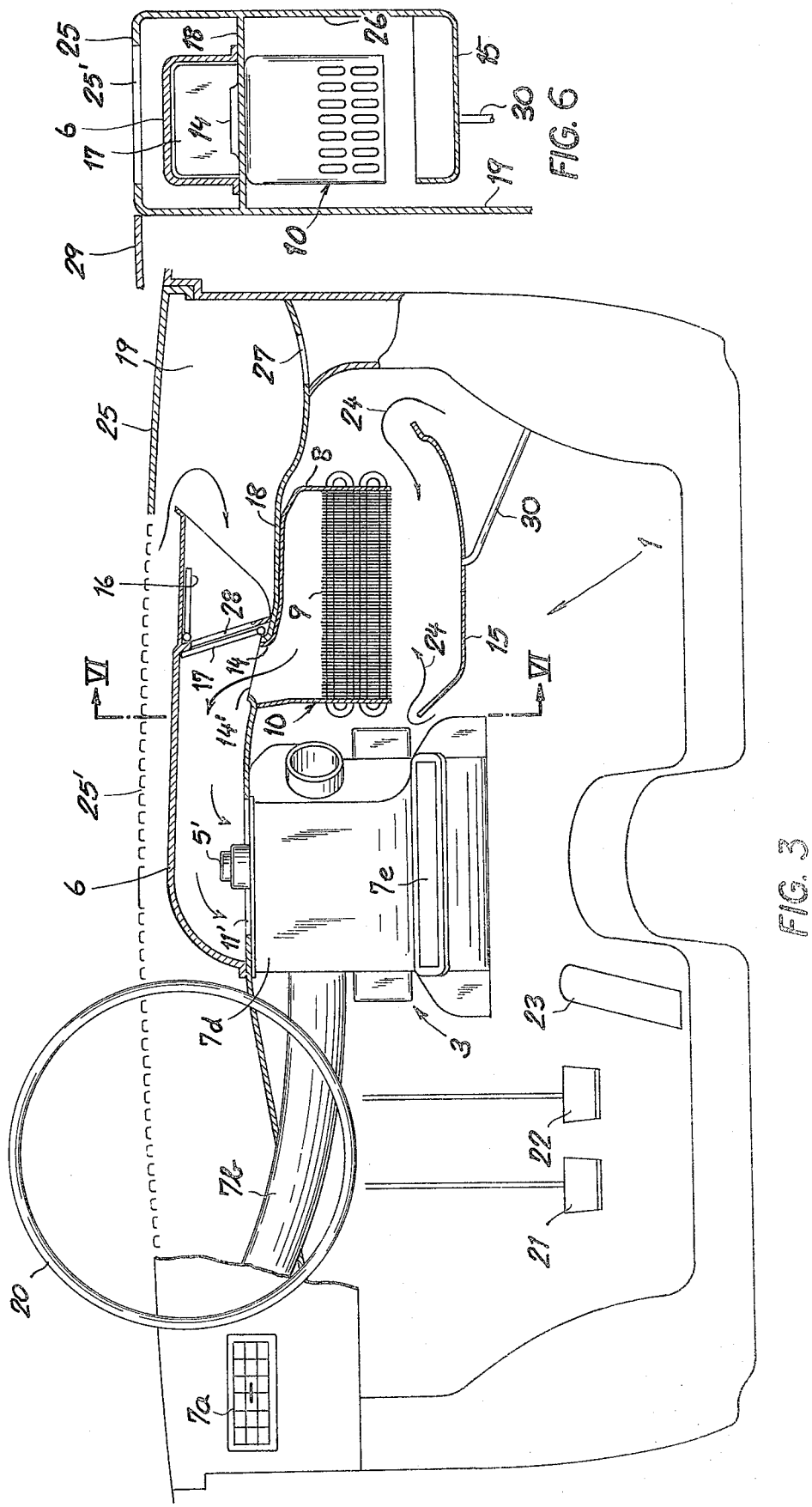

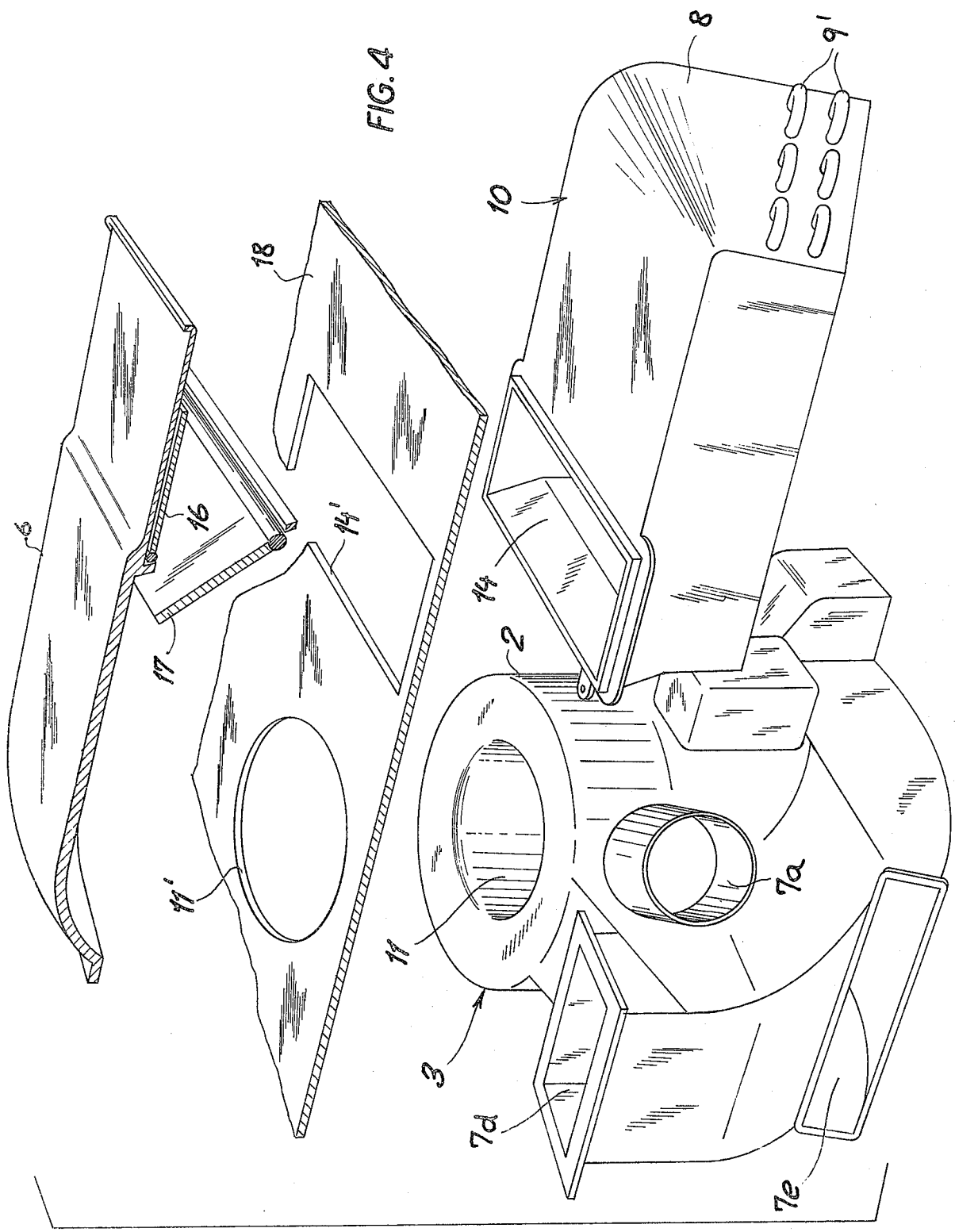

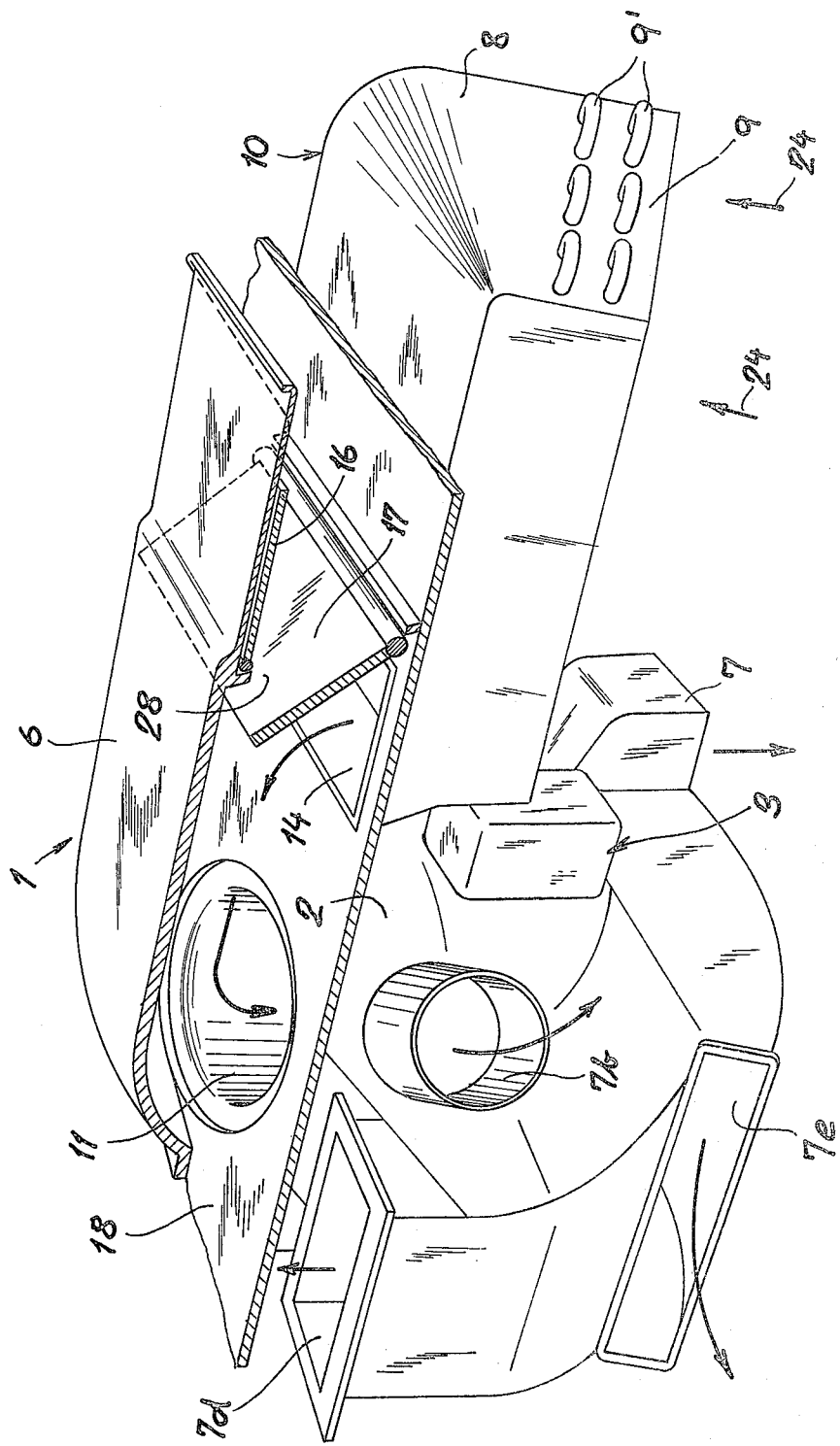

TEMPERATURE-CONTROL SYSTEM FOR AUTOMOTIVE VEHICLES

FIELD OF THE INVENTION

Our present invention relates to a temperature-control system for an automotive vehicle, more particularly a system for alternately heating and cooling the air in the interior of such a vehicle.

BACKGROUND OF THE INVENTION

Passenger cars and other automotive vehicles designed for use in moderate climates generally come equipped with a heater provided with a fan or blower for the circulation of air to be heated. The installation of an air-conditioning unit for cooling purposes generally requires the use of an additional blower and a separate duct system. While it is known to combine an air heater and an air cooler in a single assembly, such a construction does not allow installation of the heater alone for a user not interested in air conditioning.

OBJECTS OF THE INVENTION

The general object of our present invention is to provide a vehicular temperature-control system of the character set forth which avoids the aforestated disadvantages.

A more particular object is to provide a system whose heating and cooling units, though independently mountable or demountable behind the dashboard of an automotive vehicle, coact to allow simultaneous operation for the circulation of warm but dry air.

SUMMARY OF THE INVENTION

In accordance with this invention we provide an air heater whose housing has an upwardly open intake port and one or more exits for the heater air. An air cooler, positioned alongside that heater, has an enclosure or housing provided with an entrance for ambient air and with an upwardly open discharge port for cooled air; the discharge port of the cooler and the intake port of the heater are overlain by a shroud forming a connecting duct therebetween. A blower, such as the fan usually present in the heater housing, serves for the circulation of air through both units in tandem; depending on which of these units is made operational by the driver, the circulating air is either cooled or heated. In some instances, when dry air but no cooling is desired by the occupants of the vehicle, both components may be in simultaneous operation; the air is then first dehydrated by the cooler and then brought to a suitable higher temperature by the heater.

In accordance with a more particular feature of our invention, the heater and the cooler are detachable from one another and from the overlying shroud. Upon such detachment, the heater (or possibly the cooler) may be used alone on being provided with a supplemental attachment for controlling the admission of ambient air to its housing.

The bottom of the connecting duct is preferably formed by a plate which is separated from the shroud and is provided with apertures respectively registering with and framing the two aforementioned ports, these ports being substantially disposed in a common horizontal plane. Advantageously, if the system is to be installed in a vehicle provided forwardly of its dashboard with a catch basin for rain falling through a slotted or otherwise perforated hood portion, the apertured plate is constituted by the bottom of the basin. In such an installation, the lower part of the dashboard shielding the two units from the occupants of the vehicle may be integrally extended to form a drip pan beneath the downwardly open enclosure or housing of the cooling unit.

In order to facilitate the admission of outside air directly to the heater, either admixed with the cold air from the cooler or in lieu thereof, the shroud advantageously has an inlet for ambient air as well as valve means for controlling the air flow to the intake port of the heater from that inlet and/or from the discharge port of the cooler. Such valve means may take the form of two separate flaps, one of them acting as a shutter for the inlet while the other is swingable between two limiting portions respectively obstructing that inlet and the adjoining discharge port.

BRIEF DESCRIPTION OF THE DRAWING

The above and other features of our invention will be described in detail hereinafter with reference to the accompanying drawing in which:

FIG. 3 is a further view similar to FIG. 1, showing the complete system installed;

FIG. 4 is an exploded perspective view of our system, with parts broken away;

FIG. 5 is a perspective view similar to FIG. 4 but showing the system in its assembled condition; and FIG. 6 is a fragmentary cross-sectional view taken on the line of VI—VI of FIG. 3.

SPECIFIC DESCRIPTION

Figure 1:
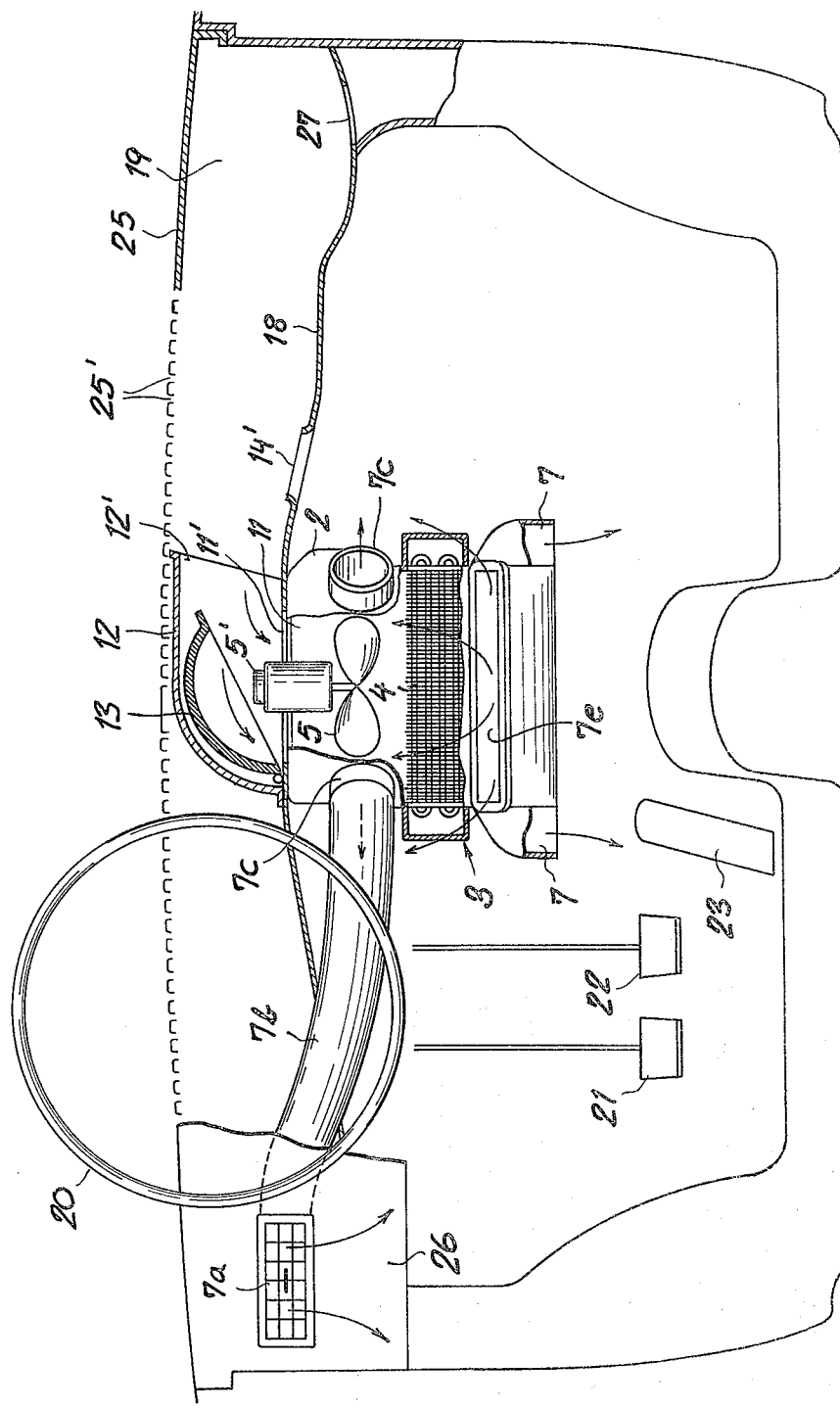
FIG. 1 is a face view, as seen from the driver's seat, or the fore part of an automotive vehicle equipped with a heater forming part of a temperature-control system according to our invention.

In FIGS. 1–3 and 6 we have shown several conventional components of an automotive vehicle, specifically a passenger car, including a fire wall 19, a steering wheel 20, a clutch pedal 21, a brake pedal 22, an accelerator pedal 23, a stationary cowl 25 in line with a hood 29 (FIG. 6), and a dashboard 26. Wall 19 has a roughly horizontal rearward extension 18 forming the bottom of a catch basin for rain or snow falling through a grillwork 25' of cowl 25, this basin emptying into a pair of lateral drain holes 27 (only one shown). Bottom plate 18 supports a conventional heating unit 3 with a housing 2, an air heater 4 in that housing and a fan 5 just above that heater, the fan being driven by a motor 5' positioned in an upwardly open entrance port 11 of housing 2 registering with an aperture 11' in plate 18. Housing 2 has several outlets for the air delivered by fan 5, i.e. a bottom opening 7 and a pair of lateral vents 7a (only one shown) connected via conduits 7b with respective housing ports 7c; two further outlets are shown at 7d and 7e in. Housing 2 is surmounted above plate 18 by a shroud 12 open at 12' to the airspace underneath cowl 25 which communicates via grillwork 25' with the outer atmosphere; the connection between inlet opening 12' and entrance port 11 can be partly or completely closed with the aid of a swingable cap 13 pivotally mounted within shroud 12.

Figure 2:
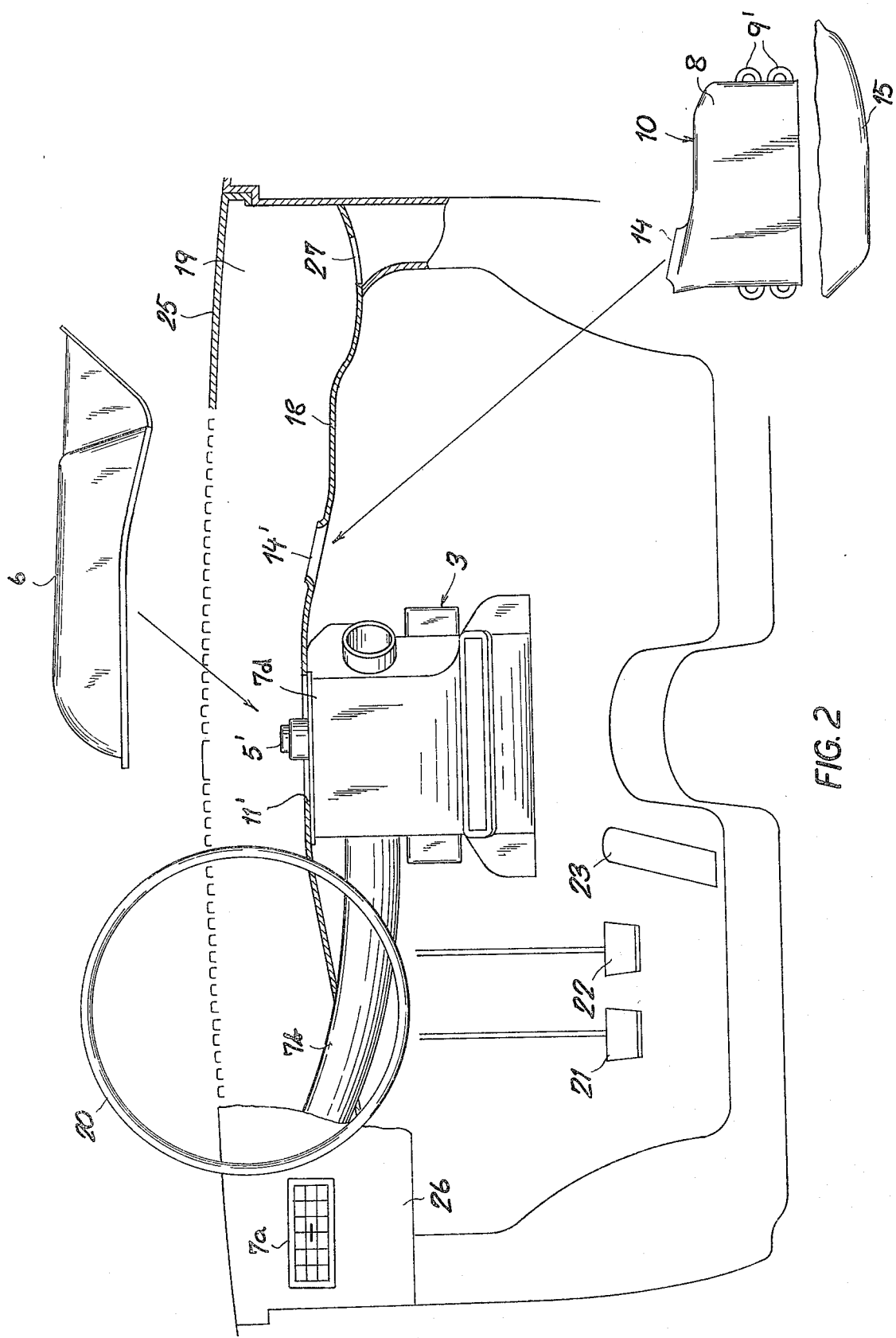
FIG. 2 is a view similar to FIG. 1, showing the remaining components of the system prior to their installation.

In FIG. 2 the shroud 12 has been removed to expose the intake port 11; in its stead, a somewhat larger shroud 6 is to be placed on the bottom 18 of the catch basin so as to span the aperture 11' thereof and another aperture 14' positioned to register with an upper discharge port 14 of an enclosure 8 which constitutes the housing of an air cooler 9 forming part of an air-conditioning unit 10. The downwardly open housing 8 is suspended, as shown in FIG. 3, from plate 18 alongside the housing 2 of heater 3 so that air, circulated by fan 5, is drawn from below into entrance end of the air channel formed by the combined temperature-control system 1 as indicated by arrows 24, passes upwardly through housing 8 via cooler 9, exits through port 14 into the duct formed by shroud 6 and plate 18, enters the housing 3 through port 11, descends through the heater 4 thereof, and is discharged at exits 7, 7a, 7d and 7e into the interior of the vehicle. Housings 2 and 8 respectively constitute a downstream section and an upstream section of the air-circulation structure 1.

Shroud 6 is laterally open at an ancillary air inlet 28 which can be closed by a flap 17 acting as a selective shutter for this inlet and for the discharge port 14 of cooler housing 8 to which it is hinged at the junction of the two openings upstream of heater 4 but downstream of cooler 9. In an intermediate position, flap 17 admixes some ambient air from the space beneath the cowling 25, 25' with the rising air from the cooler. Another flap 16, independently swingable on shroud 6, serves as an alternate shutter for inlet 28. The two flaps are manually controllable by nonillustrated knobs on dashboard 26. The right-hand half of this dashboard (as viewed in FIGS. 1–3) is integral with a drip pan 15 disposed underneath housing 8, this pan being drained via a conduit 30.

Air cooler 9 is shown as a heat exchanger comprising a set of finned pipes 9' which extend forwardly under the hood 29 to form a closed circuit for a working fluid; this circuit includes such conventional and nonillustrated elements as a compressor and a condenser exposed to a stream of cooling air, e.g. from the usual radiator fan. Heater 4 has likewise been depicted as coiled, carrying a hot fluid such as water heated by the engine, though electric heating elements could also be used.

With inlet 28 closed by flap 16, air circulated by fan 5 along the aforedescribed path may be either cooled by unit 9 or heated by unit 4. If both units are in operation, the system 1 acts as a dehumidifier. With flap 16 withdrawn as shown in the drawing, flap 17 determines the ratio of ambient to cooled air in the stream passing through housing 2.

We claim:

1. A temperature-control system for the interior of an automotive vehicle, comprising:

an air-circulation structure having an upstream section and a downstream section, said structure forming a channel with an entrance end at said upstream section, an exit end at said downstream section and an intake port at an intermediate location between said sections, said entrance and exit ends being open to the interior of the vehicle, said intake port being open to the surrounding atmosphere;
   a blower in said downstream section for generating an air stream in said channel;
   an air cooler in said upstream section traversed by at least a portion of said air stream;
   an air heater in said downstream section traversed by said air stream; and
   flow-control means on said structure at said intermediate location for selectively varying the proportion of ambient and recirculated air admitted into said channel through said intake port and through said entrance end, respectively.

2. A system as defined in claim 1 wherein said downstream section is a heater housing and said upstream section is a cooler housing alongside said heater housing, said structure further including a generally horizontal plate and an overlying shroud together defining a connecting duct for said housings, said intake port being formed in said shroud.

3. A system as defined in claim 2 wherein said plate overlies said housings and has a first aperture adjacent said intake port communicating with said cooler housing and a second aperture remote from said intake port communicating with said heater housing, said flow-control means comprising a flap swingable between two limiting positions respectively obstructing said intake port and said first aperture.

4. A system as defined in claim 2 wherein said cooler housing is detachable from said plate.

5. In an automotive vehicle provided with a perforated cowl overlying a catch basin, the combination therewith of a system as defined in claim 2 wherein said plate is the bottom of said catch basin.

6. The combination defined in claim 5, further comprising a dashboard between said catch basin and the interior of the vehicle, and a drip pan integral with said dashboard below said cooler housing, said entrance end being downwardly open toward said drip pan.

7. A system as defined in claim 3 wherein said flow-control valve means further comprises a shutter for said intake port independent of said flap.

8. A system as defined in claim 1 wherein said air cooler comprises a heat exchanger provided with finned conduit means.

* * * * *